United States Patent
Matsumoto et al.

[11] Patent Number: 6,144,793
[45] Date of Patent: *Nov. 7, 2000

[54] WAVELENGTH DEPENDENCE CORRECTION METHOD IN OPTICAL VARIABLE ATTENUATOR

[75] Inventors: Yoshinori Matsumoto; Hiroyuki Sugimura, both of Tokyo, Japan

[73] Assignee: Ando Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/043,687
[22] PCT Filed: Jul. 29, 1997
[86] PCT No.: PCT/JP97/02616
 § 371 Date: Mar. 26, 1998
 § 102(e) Date: Mar. 26, 1998
[87] PCT Pub. No.: WO98/04896
 PCT Pub. Date: Feb. 5, 1998

[30] Foreign Application Priority Data

Jul. 29, 1996 [JP] Japan .................................. 8-215998

[51] Int. Cl.⁷ .............................. G02B 6/00; H04B 10/00
[52] U.S. Cl. .................... 385/140; 385/147; 359/153; 359/161; 359/187; 359/194
[58] Field of Search .................................. 385/140, 147; 359/153, 161, 187, 194

[56] References Cited

U.S. PATENT DOCUMENTS

| | | | |
|---|---|---|---|
| 4,516,827 | 5/1985 | Lance et al. | 385/140 X |
| 4,591,231 | 5/1986 | Kaiser et al. | 385/140 |
| 5,226,104 | 7/1993 | Unterleitner et al. | 385/140 |
| 5,325,459 | 6/1994 | Schmidt | 385/140 |
| 5,361,319 | 11/1994 | Antos et al. | 385/123 |
| 5,432,875 | 7/1995 | Korkowski et al. | 385/27 |
| 5,455,672 | 10/1995 | Lamonde et al. | 356/73.1 |
| 5,592,284 | 1/1997 | Bedard | 356/73.1 |
| 5,642,456 | 6/1997 | Baker et al. | 385/140 |
| 5,694,512 | 12/1997 | Gonthier et al. | 385/140 |
| 5,742,725 | 4/1998 | Longobardi et al. | 385/140 |
| 5,745,271 | 4/1998 | Ford et al. | 359/130 |
| 5,805,759 | 9/1998 | Fukushima | 385/140 |
| 5,900,983 | 5/1999 | Ford et al. | 385/140 X |
| 5,963,291 | 10/1999 | Wu et al. | 385/140 X |

FOREIGN PATENT DOCUMENTS

| | | | |
|---|---|---|---|
| 0 257 973 A2 | 3/1988 | European Pat. Off. | 385/140 X |
| 0 685 947 A1 | 12/1995 | European Pat. Off. | 385/140 X |
| 0 717 302 A2 | 6/1996 | European Pat. Off. | 385/140 X |
| 60-237328 | 11/1985 | Japan | 385/140 X |
| 62-115330 | 5/1987 | Japan | 385/140 X |
| 8-248455 | 5/1987 | Japan | 385/140 X |
| 6-132895 | 5/1994 | Japan | 385/140 X |
| 9-145540 | 6/1997 | Japan | 385/140 X |

OTHER PUBLICATIONS

Patent Abstracts of Japan, Publication No. 08248455.
Patent Abstracts of Japan, Publication No.62115330.
Patent Abstracts of Japan, Publication No, 06132895.

*Primary Examiner*—Brian Healy
*Attorney, Agent, or Firm*—Fish & Richardson P.C.

[57] ABSTRACT

The present invention provides a wavelength dependent compensation method in a variable optical attenuator which can precisely set the amount of attenuation within a wide range of wavelengths, and to provide superior operability. An optical signal 20*a* is emitted from a white light source 20 incident on a monochromator 21, and under control of a CPU 24, only an optical signal 20*b* of a specific wavelength is extracted and is made incident on a variable optical attenuator 22; in optical attenuator 22 under control of a CPU 24, optical signal 20*b* is attenuated; the power of attenuated optical signal 20*c* is measured by power measurer 23 under control of a CPU 24, producing compensating data; and using the pulse number corresponding to the rotation angle of the motor which activates the variable optical attenuator 22 according to this compensating data, the position of variable optical attenuator 22 is compensated to attain the desired amount of attenuation.

5 Claims, 9 Drawing Sheets

WAVELENGTH DEPENDENCE CORRECTION METHOD IN OPTICAL VARIABLE ATTENUATOR

BACKGROUND OF THE INVENTION

1. Field of the Invention

The present invention relates to a wavelength-dependent compensation method in a variable optical attenuator, and in particular to a wavelength-dependent compensation method in a variable optical attenuator which attenuates the wavelength of an optical signal over a wide range of wavelengths in the optical signal, measures the power of the optical signal with attenuated wavelengths, and supplies compensation data which compensates wavelength-dependent loss.

2. Description of Related Art

It is known that the amount of attenuation of a natural density filter (herebelow, abbreviated "ND filter") generally used to suppress the amount of light in a variable optical attenuator depends on wavelength characteristics. In order to achieve an accurate setting of the amount of attenuation, it is necessary to limit attenuation to a single wavelength, to actuate an ND filter with a motor drive member, to produce rotation of the motor by the input of the pulse of its motor drive, and either to compensate only the number of pulses corresponding to the angle of rotation of the motor with respect to the amount of attenuation, or to compensate the entire range of wavelengths to be set by using compensating data for the amount of attenuation.

Figure 9:
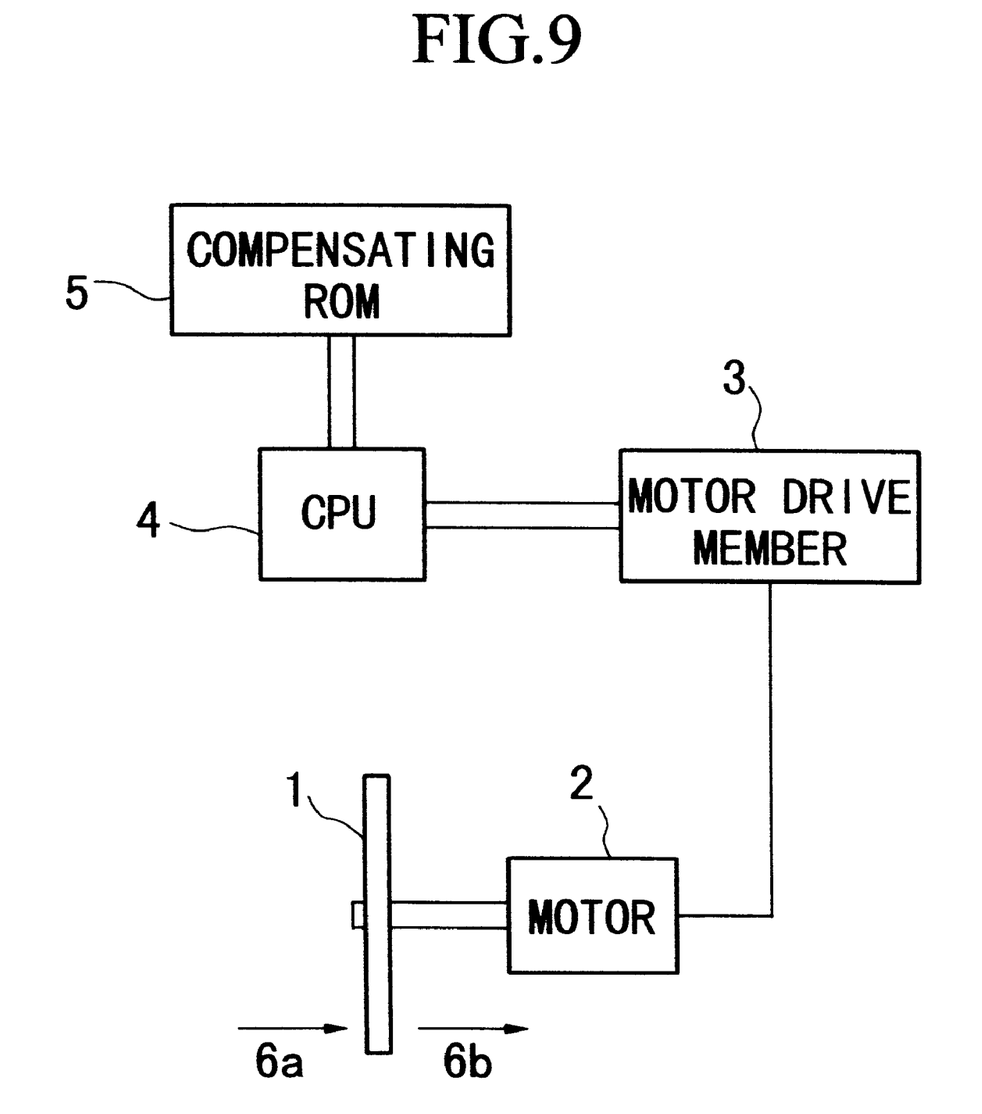
FIG. 9 is a block diagram showing the structure of a variable optical attenuator used in the wavelength dependent compensation method in the conventional variable optical attenuator.

The method of compensating wavelength-dependency of an ND filter used in conventional variable optical attenuators is explained in FIG. 9.

FIG. 9 is a block diagram showing a structure of a variable optical attenuator applying a conventional compensation method for wavelength-dependency. In FIG. 9, an optical signal 6a that transits ND filter 1 is attenuated so as to equal the preset value of the amount of attenuation set by ND filter 1 and is transformed into attenuated optical signal 6b. The motor 2 is actuated by motor drive member 3 under control of a CPU 4.

If the wavelength of optical signal 6a transiting ND filter 1 is uniform, the amount of attenuation of the ND filter 1 is proportional to the angle of rotation, and the angle of rotation of motor 2 is proportional to the pulse number input into the motor drive member 3.

Figure 2:
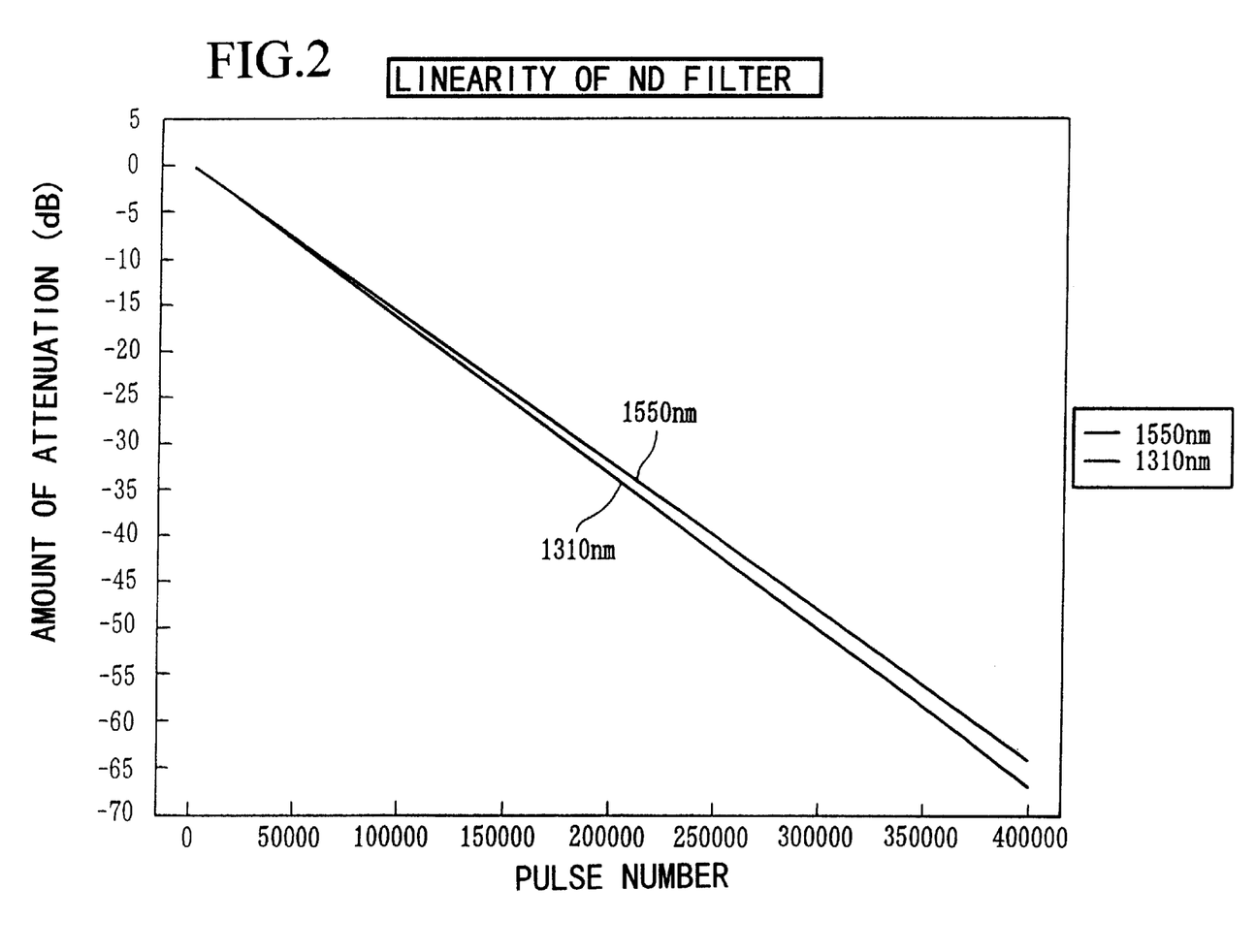
FIG. 2 is a graph of the linearity of the ND filter in the system of measurement of wavelength dependency of FIG. 1 used in the variable attenuator.

However, as is clear from the wavelength-characteristics graph of an ND filter 1 shown in FIG. 2, where the abscissa is the pulse number and the ordinate is the amount of attenuation (dB), generally in the attenuation of an ND filter 1, the correction of the amount of attenuation is conventionally limited to a single wavelength (e.g., 1310 nm) because there is wavelength dependency.

Therefore, an accurate amount of attenuation of an optical signal differing from the wavelength used for correction (e.g., 1310 nm) could not be attained.

Because of this, when precisely setting the amount of attenuation with a conventional variable optical attenuator, it is necessary to measure for each wavelength, the relationship between the amount of attenuation of an ND filter 1 and the number of pulses corresponding to the angle of rotation of motor 2, and store the compensating data for each wavelength in the compensating ROM 5 (see FIG. 9) under the control of a CPU 4. However, as can be understood from the linear graph of an ND filter 1 in FIG. 2, used when we explain below the embodiments of the present invention, at each wavelength the relationship between the amount of attenuation of an ND filter 1 and the number of pulses corresponding to the angle of rotation of motor 2 are wavelength dependent (i.e., the linear slope for each wavelength is different).

Figure 3:
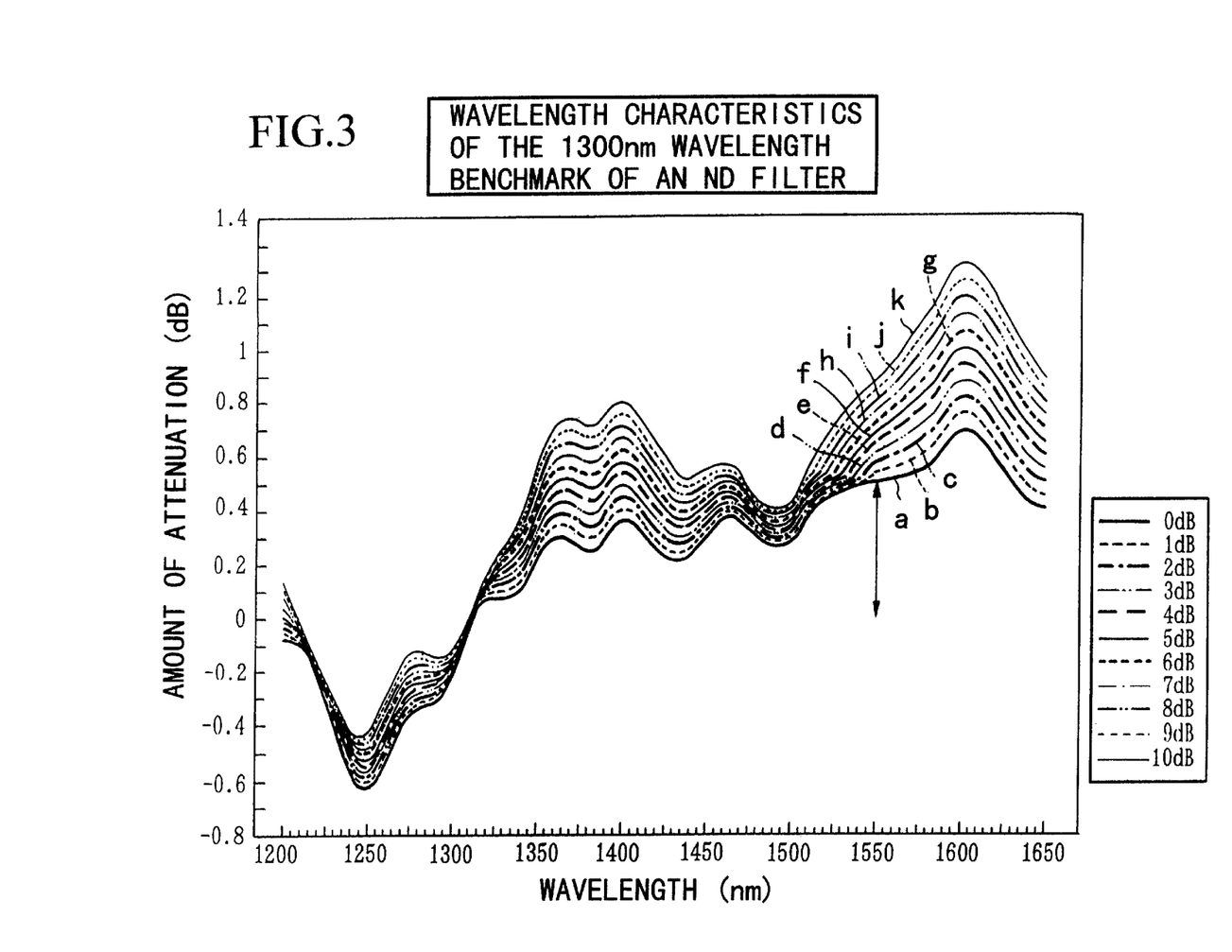
FIG. 3 is a graph showing the wavelength characteristics of the 1300 nm wavelength benchmark time of an ND filter used in the variable attenuator in the measurement system of the wavelength dependency of FIG. 1.

In addition, from the wavelength characteristic graph of an ND filter in FIG. 3, where the abscissa is the wavelength (nm) and the ordinate is the amount of attenuation (dB), the problem arises that even when the preset value of the amount of attenuation is near 0 dB (insertion loss), there is wavelength-dependency.

Therefore, in the conventional variable optical attenuators, in accurately presetting the amount of attenuation with respect to an ND filter 1, the wavelength is limited to a single wavelength, and either only the pulse number corresponding to the angle of rotation (see FIG. 9) of motor 2 is compensated, or the entire range of wavelengths to be preset are compensated using compensating data of the pulse number corresponding to the angle of rotation of motor 2 with respect to the amount of attenuation of an ND filter 1.

However, in this case, for an optical signal whose wavelength differs from the wavelength (in FIG. 2, 1310 nm) used in correction, accurate amounts of attenuation cannot be obtained, and the problems arise that the number of observation operations for compensating data becomes huge, the amount of memory allocation in the compensation ROM 5 for the variable optical attenuator becomes very large, and the cost becomes very high.

SUMMARY OF THE INVENTION

In order to solve the above mentioned conventional problems, the method of wavelength dependent compensation in the variable optical attenuator of the present invention is characterized in comprising a step wherein an optical signal is generated from an optical emission means so that the power and wavelength are variable, a step wherein a specific wavelength in this optical signal is attenuated by an optical signal attenuation means which sets the value of a pre-determined wavelength and the preset value of the amount of attenuation of the attenuated wavelength, and a step inputting the compensation data provided by a measurement means which measures the optical signal attenuated with this optical signal attenuation means for the wavelength dependent loss compensation in this optical attenuation means.

According to this invention, by entering an optical signal produced from the optical emission means, which can vary the power and wavelength, into the optical signal attenuation means, a pre-determined wavelength of the optical signal is attenuated, the power of the attenuated optical signal is measured by the measuring means, the wavelength dependent compensation data of the optical signal attenuation means is input, and this compensation data supplies the wavelength dependent loss compensation.

According to the present invention, it is possible to precisely set the amount of attenuation over a wide range of wavelengths, and achieve the effect of superior adjustability because 1) a specific wavelength of the optical signal from those in the optical signal generated by the optical emission means is attenuated by the optical signal attenuation means, 2) the power of the attenuated optical signal is measured with a measuring means so as to obtain compensation data of the system of measurement of the wavelength dependency, and 3) this compensation data supplies the wavelength dependent loss compensation.

DESCRIPTION OF PREFERRED EMBODIMENTS

Embodiment 1

Figure 1:
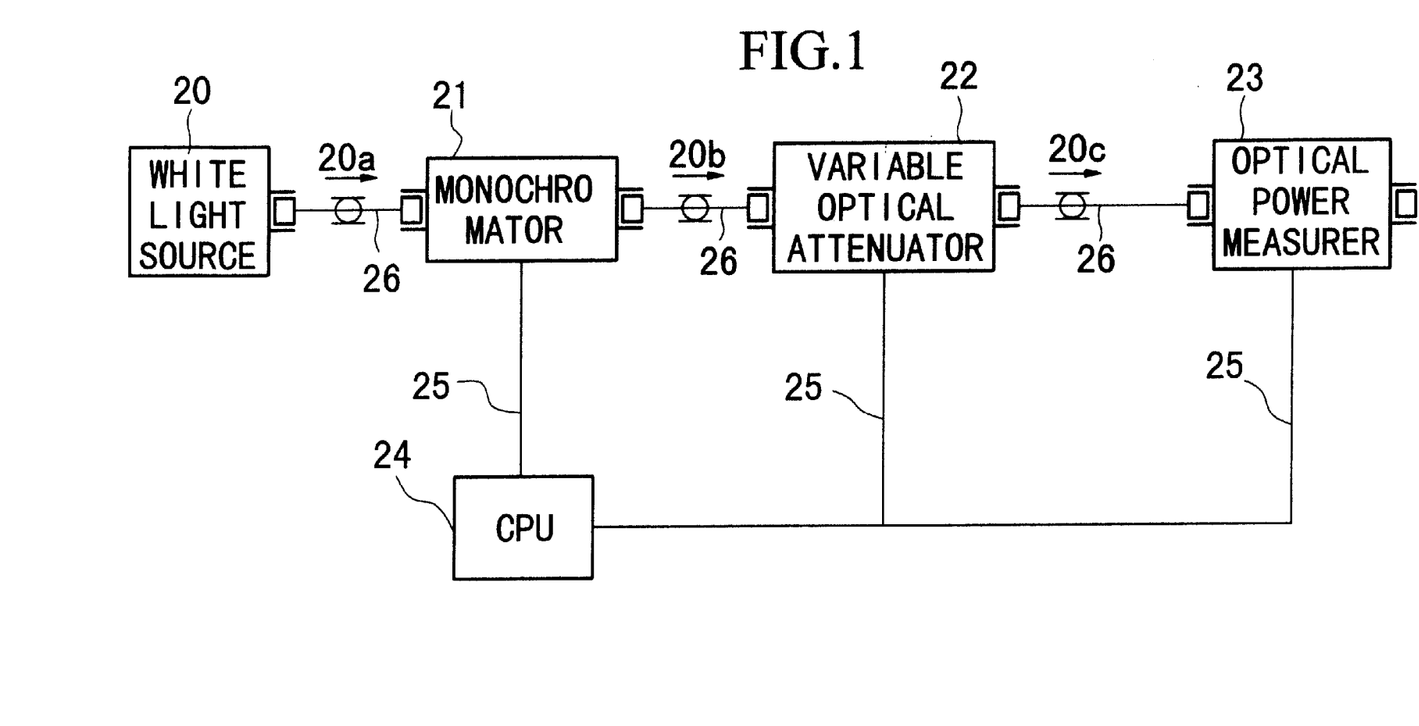
FIG. 1 is a block diagram showing the structure of the system of measurement of wavelength dependency applied to the first embodiment of the wavelength dependent compensation method of the variable attenuator of the present invention.

Below, a first embodiment of a wavelength dependent compensation method in a variable optical attenuator of the present invention is explained with reference to the figures. FIG. 1 is a block diagram showing the structure of the system of measurement of wavelength dependency applied in the first embodiment.

In FIG. 1, a white light source which emits optical signal 20a having a wide range of wavelengths is used as an optical emission means, and below, in the first embodiment, our explanation will proceed with this white light source 20 as the optical emission means.

Optical signal 20a emitted from white light source 20 is incident upon the optical signal extraction means for extracting an optical signal 20b of a specific wavelength. In this first embodiment, a monochromator 21 is used as an optical signal extraction means, and in the following explanation, we will proceed using this monochromator 21.

The optical signal 20b emitted from monochromator 21 is incident on a variable optical attenuator used as an optical signal attenuation means, such as an ND filter, (we will explain the first embodiment using variable optical attenuator 22 below), and the attenuated optical signal from this variable optical attenuator 22 is emitted as optical signal 20c.

Optical signal 20c is measured by optical power measurer 23 (this measuring means is explained along with the optical power measurer 23 below) used as a measurement means. The white light generator 20, the monochromator 21, variable optical attenuator 22, and the optical power measurer 23 are each connected by an optical fiber 26.

Additionally, monochromator 21, variable optical attenuator 22, and optical power measurer 23 are connected by GP-IB25 (control bus) to a CPU, which is a controlling means, (as a controlling means, we will use a CPU designated 24 below), and the monochromator 21, variable optical attenuator 22, and optical power measurer 23 are controlled by CPU 24.

Next, we will explain the operation of the first embodiment constructed as described above. First, a preset value of the wavelength of the variable optical attenuator 22 is set to 1310 nm, for example, and a preset value of the amount of attenuation is set to 0 dB.

The optical signal 20a is emitted from the white light source incident on the monochromator 21 under the above conditions. The optical signal 20b is incident on the variable optical attenuator 22 (amount of attenuation being 0 dB), the attenuated optical signal 20c is input into the optical power measurer 23, and its power is measured. The repetition of the above measurements is carried out at 1 dB steps of the preset values of the amount of attenuation from 0 to 10 dB, with a benchmark wavelength preset value 1310 dB of the variable optical attenuator 22.

In FIG. 3, the intervals (amount of attenuation) between b, c, d, e, f, g, h, i, j, and k are equal, while the interval between a and b (amount of attenuation) is different. Therefore, from b to k, the intervals are equal and linear, while the interval between a and b, in contrast, is non-linear. In order to confirm the linearity of the amount of attenuation in the wavelength dependency, in FIG. 4, the benchmark of the preset value of the amount of attenuation is set to 0 dB, the abscissa is wavelength (nm) and the ordinate is the amount of attenuation 0 dB.

However, as is apparent from FIG. 3, in contrast to the optical signal with wavelengths differing from the standard, even at the preset value of 0 dB for the amount of attenuation, there is wavelength dependency.

Figure 4:
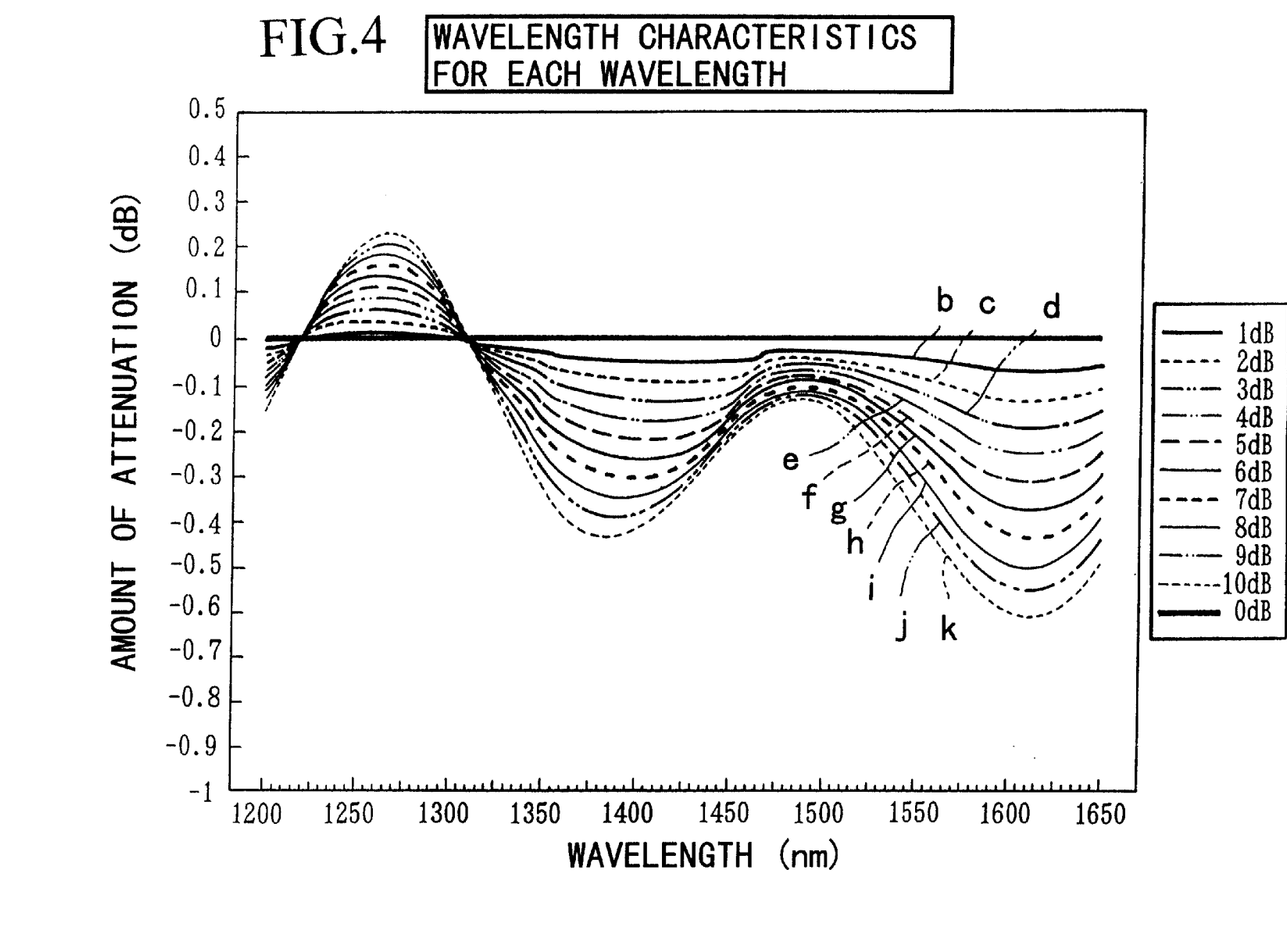
FIG. 4 is a graph of the regenerated wavelength characteristics taking the preset value 0 dB of the amount of attenuation as the benchmark in order to confirm the linearity of the amount of attenuation of the wavelength characteristics of an ND filter used in the variable attenuator in the system of measurement of the wavelength dependency of FIG. 1.

In FIG. 4, because the intervals (amount of attenuation) between b, c, d, e, f, g, h, and, j, and k are equal, the amount of attenuation as a function of wavelength dependency is linear for preset values of the amount of attenuation from 0 to 10 dB.

Next, we compensate the wavelength dependence of the preset value of the amount of attenuation from 0~60 dB of the variable optical attenuator 22.

The output level of the optical signal 20a emitted from the white light source is a low −40 dB, and when the set value of the amount of attenuation of the variable optical attenuator is made 60 dB, the optical signal 20c attenuated by the variable optical attenuator 22 has an output level of −100 dB, and could not be measured with the light power measuring device.

Here, a semiconductor laser 60 (wavelength: 1310 nm or 1550 nm) with a large output level compared to the white light source 20 was used. By confirming the linearity of the amount of attenuation of the wavelength dependency, the preset value of the amount of attenuation from 0 to 60 dB of the variable optical attenuator 22 is compensated.

Embodiment 2

Figure 5:
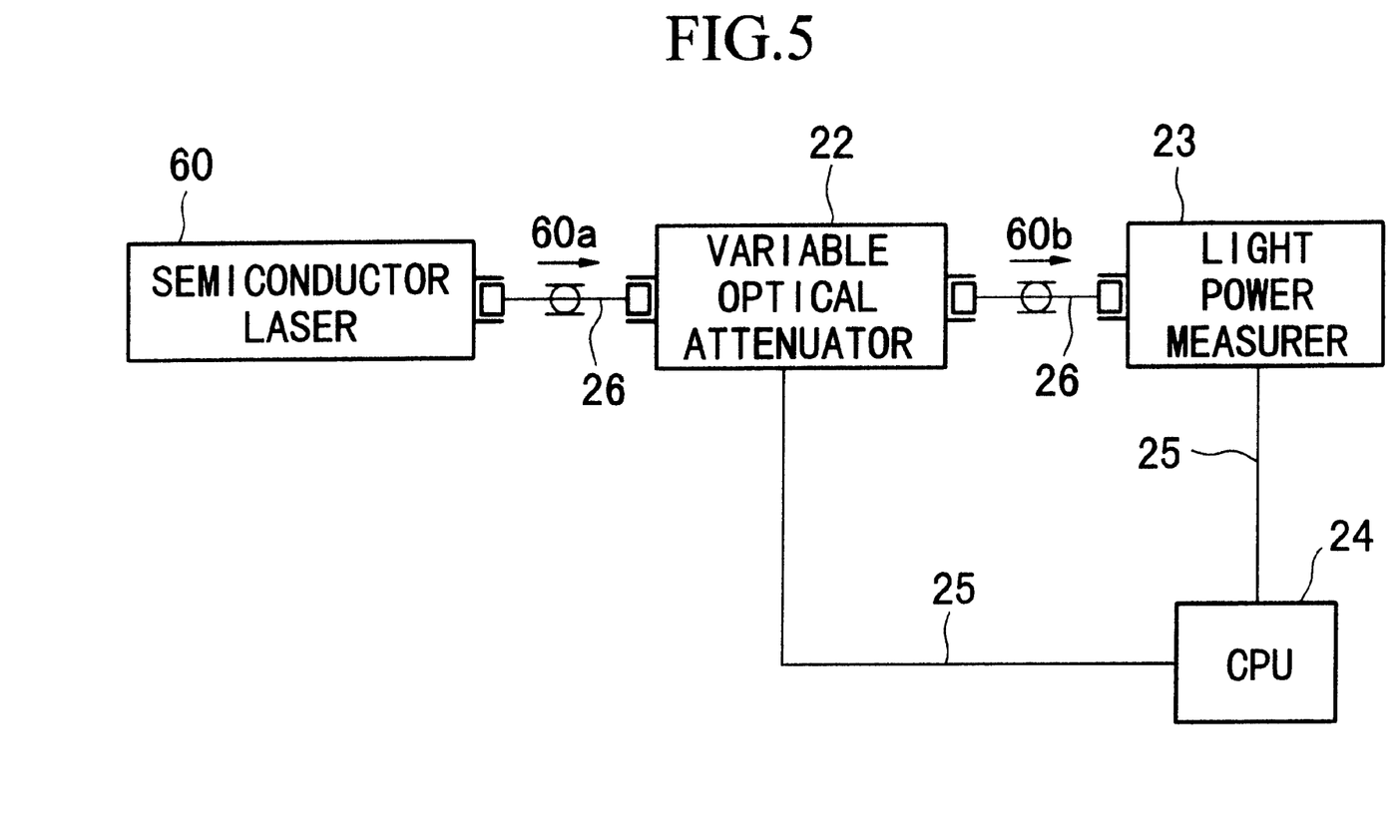
FIG. 5 is a block diagram showing the structure of the system of measurement of wavelength dependency applied in the second embodiment of the wavelength dependent compensation method in the variable optical attenuator of the present invention.

FIG. 5 is a block diagram showing the structure of a measurement system for wavelength dependency applied to the second embodiment of the present invention when using a semiconductor laser 60 which emits the above optical signal 60 of the wavelength 1310 nm/1550 nm.

In FIG. 5, the large output level optical signal 60a emitted from semiconductor laser 60 is incident on the variable optical attenuator 22 via optical fiber 26, is attenuated, and is emitted from variable optical attenuator 22 as optical signal 60b.

The optical signal 60b attenuated by the above variable optical attenuator 22 is incident on the light power measurer 23 which is the measuring means, and there the power of optical signal 60b is measured. The variable optical attenuator 22 and the light power measurer 23 are connected through the CPU 24 by GP-IB25, the controlling means, and is controlled. In FIG. 5, the monochromator 21 of FIG. 1 is omitted.

As is clear from the above, by being constructed in this manner, the optical signal 60a (wavelength 1310 nm/1550 nm both greater than 0 dB) emitted from semiconductor 60, are attenuated (0~60 dB) by the variable optical attenuator 22, and the power of the attenuated optical signal 60b is measured by the light power measurer 23.

A pulse number corresponding to the angle of rotation of motor 2 for actuating the ND filter in the variable optical attenuator shown in FIG. 9 is sent to the motor drive member 3, and the amount of attenuation of the variable optical attenuator 22 is determined by controlling the rotation angle of the motor. As a result of the above measurements, the filter characteristics shown in FIG. 2 were obtained.

In FIG. 2, because the graphs of the above wavelengths 1310 nm and 1550 nm are linear when the amount of attenuation is a function of the pulse number corresponding to the rotation angle of the motor 2 shown in FIG. 9, the two wavelengths 1310 nm and 1550 nm can be judged to be linear. Therefore, the other wavelengths can also be assumed to be linear.

Figure 6:
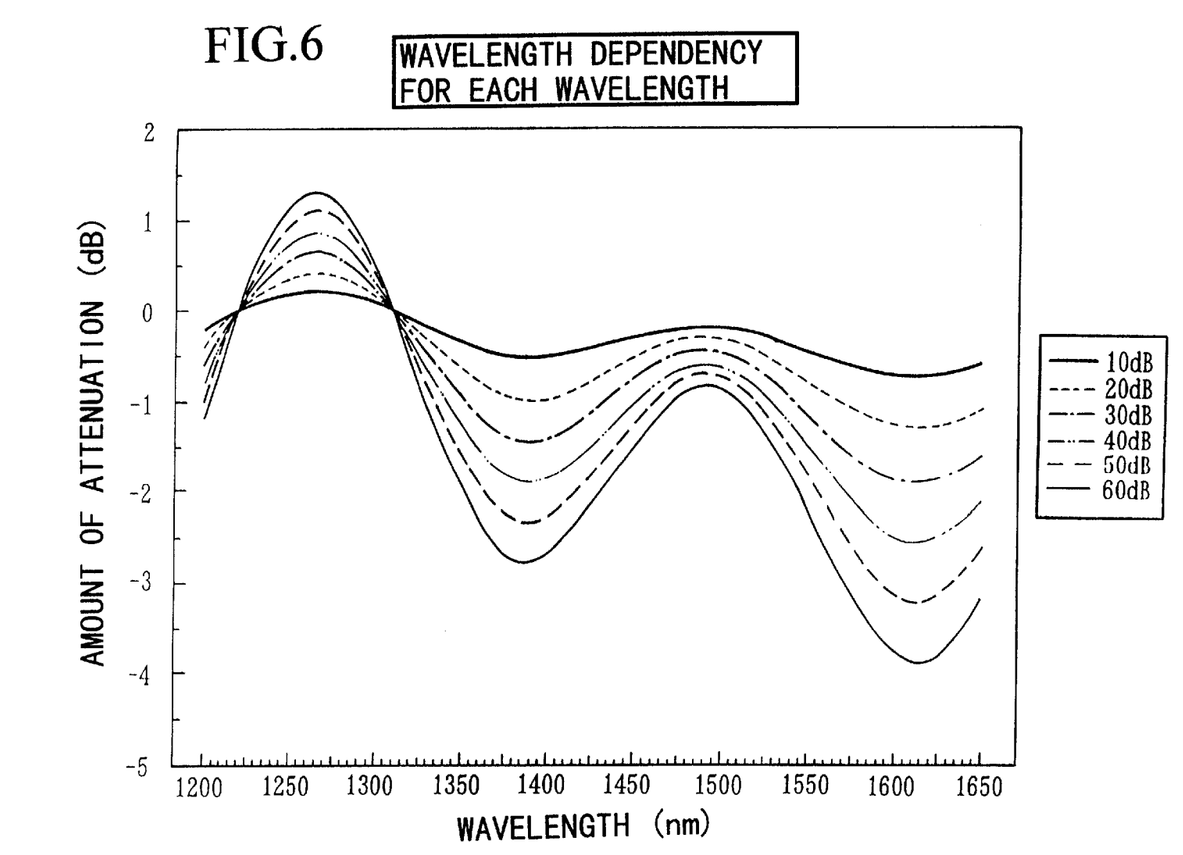
FIG. 6 is a graph produced by calculating the wavelength dependency for each wavelength up to the preset value of 60 dB based on the data of a preset value of 10 dB for the amount of attenuation of the variable optical attenuator in the system of measurement of wavelength dependency of FIG. 5.

With respect to wavelengths of the above two 1310 nm and 1550 nm wavelengths, because we judge that the amount of attenuation as a function of the pulse number corresponding to the angle of rotation of motor 2 shown in FIG. 9 is linear, FIG. 6 showing the wavelength characteristics of the amount of attenuation up to a preset value of 60 dB is produced on the basis of the data of the amount of attenuation up to the preset value 10 dB in each wavelength of FIG. 4 (the data of the amount of attenuation of the set value 10 dB is increased 6 times).

In fact, as is apparent from FIG. 3, the wavelength dependency of variable optical attenuator 22 has not only regions where the amount of attenuation as a function of the pulse number corresponding to the rotation angle of the motor 2 is linear, but it also has non-linear regions in the amount of attenuation of the set value 0 dB. Thus the general wavelength characteristics are shown in the following equation (1):

$$A\lambda = A\lambda_0 + A_{TT}\lambda, \qquad (1)$$

where, $A\lambda$ is the general wavelength characteristic, $A\lambda_0$ is the wavelength dependency of variable optical attenuator 22 of the amount of attenuation of the time 0 dB of the preset value, and $A_{TT}\lambda$ is the wavelength dependency at the time that the amount of attenuation with a preset value 0 dB was the benchmark.

Figure 7:
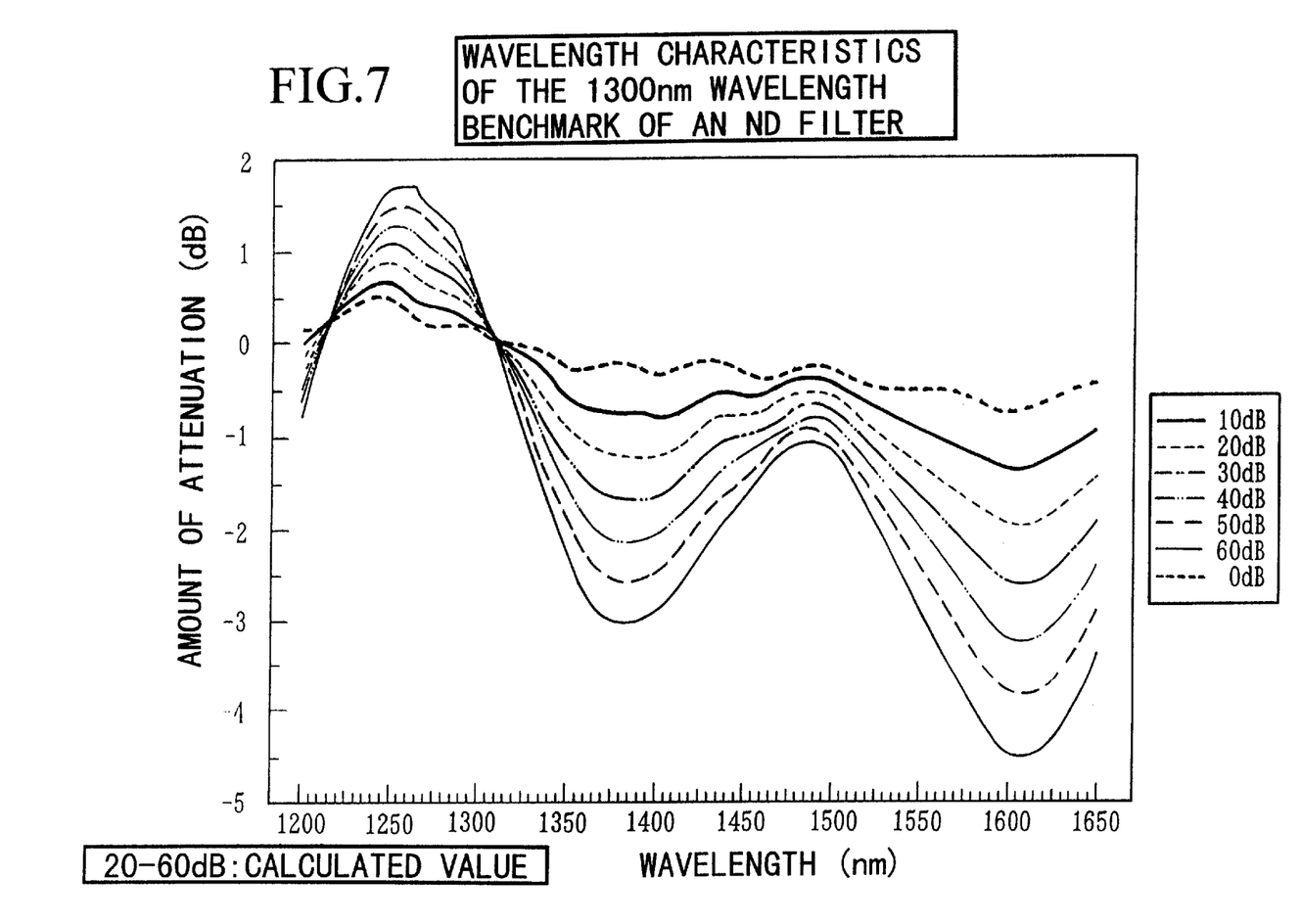
FIG. 7 is a graph of the total wavelength dependency including the non-linear regions of the preset value 0 dB of the amount of attenuation of the variable optical attenuator in the system of measurement of wavelength dependency of FIG. 5.

Therefore, in consideration of the above content, taking the abscissa as the wavelength, the ordinate as the amount of attenuation (dB), and a 1300 nm wavelength as the benchmark, the wavelength characteristics of the filter with discrete values of the amount of attenuation from 20 to 60 dB are obtained, as shown in FIG. 7.

Next, the formula for wavelength compensation of the pulse number will be described.

(1) The equation of the pulse number as a function of the amount of attenuation is $$P_{131} = \alpha A_{131} + b \qquad (2)$$

where $A_{131}$ is the amount of attenuation dB at the time wavelength $\lambda$ is 1330 nm, $P_{131}$ is the pulse number in $A_{131}$ at the time wavelength $\lambda$ is 1310 nm, and a, b are the constants found by the method of least squares at the time wavelength $\lambda$ is 1310 nm.

(2) The formula for a continuous wavelength is $$P\lambda = \alpha(c\lambda + (d\lambda/10) \cdot A\lambda + A\lambda) + b \qquad (3)$$

where $P\lambda$ is the pulse number at time wavelength $\lambda$, $c\lambda$ is the loss in the light source at the time wavelength $\lambda$, and $d\lambda$ is loss at the set value 10 dB of the amount of attenuation at the time of wavelength $\lambda$.

Figure 8:
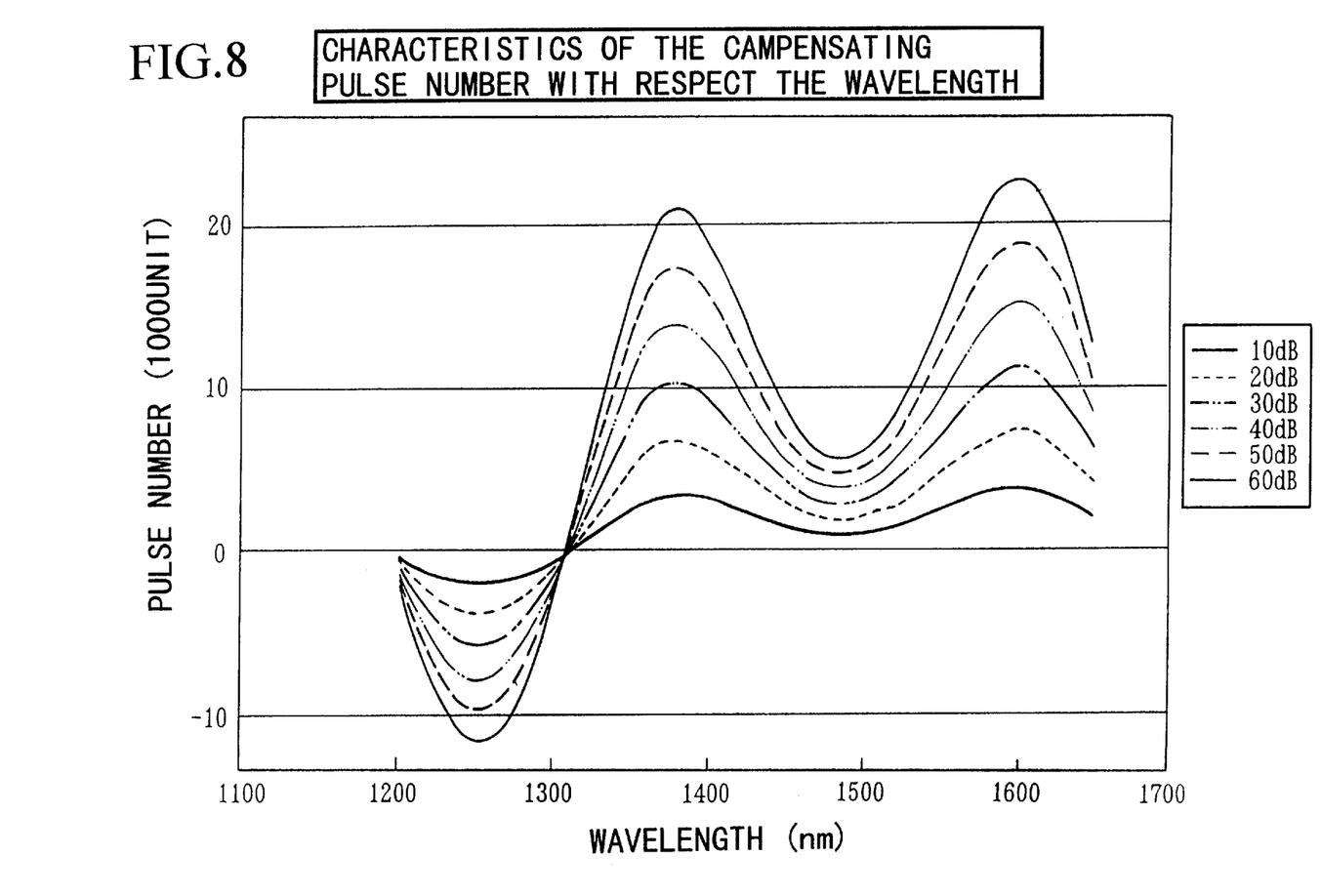
FIG. 8 is a graph showing the wavelength characteristics of the compensating pulse number with respect the wavelength of the variable optical attenuator in the system of measurement of the wavelength dependency of FIG. 5.

As explained above, in the first and second embodiments, even when the pulse number corresponding to the rotation angle of the motor as a function of the amount of attenuation of a variable optical attenuator such as an ND filter is measured for each wavelength, in any wavelength the pulse number corresponding to the amount of attenuation of the variable optical attenuator and the angle of rotation of the motor is linear, and thus if this linearity is used, when the above equations (2) and (3) are stored in the compensating ROM of the variable optical attenuator, and only the pulse number corresponding to the angle of rotation of the motor as shown in FIG. 8 is compensated, the amount of attenuation can be precisely set over a wide range of wavelengths with only a single wavelength, realizing a superior adjustment operability.

In the above manner, when the compensation data obtained by the present invention is used on the variable optical attenuator shown in FIG. 9, the compensating data is stored on compensating ROM 5 of FIG. 9 and this data is calculated by the above equations (1) for the general wavelength characteristics and (2) for wavelength compensation by pulse number are calculated in CPU 4, and then the pulse number corresponding to the angle of rotation of motor 2 sent to a motor drive 3, but by controlling the angle of rotation of motor 2, an accurate amount of wavelength attenuation can be obtained no matter what the wavelength.

To give a concrete example of obtaining an accurate amount of wavelength attenuation, because in fact there is adjustment, the $P\lambda$ of the above equation (3) for a continuous wavelength is $$P\lambda = a \cdot (c\lambda \cdot e + (d\lambda/10) \cdot A\lambda \cdot F + A\lambda) + b = a \cdot \{(d\lambda/10 \cdot f + 1) \cdot A\lambda + c\lambda \cdot e\} + b$$

The equation for the pulse number with respect to the wavelength $\lambda = 1550$ nm and the amount of attenuation set value 10 dB (f=3=1) is $$P_{155} = a \cdot \{(0.38/10 \cdot f + 1) \cdot 10 + 0.5 \cdot e\} + b = a \cdot \{(0.38/10 + 1) \cdot 10 + 0.5 + b = 10.88 \cdot a + b$$

Therefore, calculating the wavelength as 1310 nm makes the wavelength attenuation 10.88 dB.

In this manner, taking the abscissa as the wavelength and the pulse number as the ordinate, the wavelength characteristics of the compensated pulse as in FIG. 8 showing the wavelength characteristics of the compensated pulse number, no matter what the wavelength, an accurate amount of attenuation can be attained from the compensated pulse number as shown in FIG. 8.

What is claimed is:

1. A wavelength dependent compensation method in a variable optical attenuator, comprising:

a step in which an optical signal is emitted from a variable power optical emission means;

a step in which an optical signal of a specific wavelength in said optical signal is attenuated by an optical signal attenuation means that sets the value of a predetermined wavelength and the value of the amount of attenuation of the attenuated wavelength; and a step in which the optical signal attenuated by the said optical signal attenuation means is measured by a measuring means, and a step of outputting compensating data supplying wavelength dependent loss compensation to said optical signal attenuation means is output.

2. A wavelength dependent compensation method in a variable optical attenuator according to claim 1, further comprising:

a step in which the wavelength dependency of the amount of attenuation is compensated based on said compensation data to control said amount of attenuation and the amount of attenuation of selected wavelengths.

3. A wavelength dependent compensation method in a variable optical attenuator according to claim 1, wherein:

said optical signal attenuation means including a monochromator on which the optical signal emitted from said optical emission means, and the step in which said optical signal is attenuated further comprising a step in which said optical signal of specific wavelength is extracted by said monochromator.

4. A wavelength dependent compensation method in a variable optical attenuator according to claim 3 wherein:

said optical emission means is a white light source, and the step in which said optical signal is attenuated extracting a preset specific wavelength from a plurality of wavelength components emitted from said white light signal.

5. A wavelength dependent compensation method in a variable optical attenuator according to claim 3 wherein:

said optical emission means being a semiconductor laser, and the step in which said optical signal is attenuated extracting a preset specific wavelength from a plurality of wavelength components emitted from said white light source according to a preset value of said wavelength.

* * * * *